(12) United States Patent
Haack et al.

(10) Patent No.: US 10,876,750 B2
(45) Date of Patent: Dec. 29, 2020

(54) HUMIDIFIER AND METHOD FOR CONDITIONING AIR

(71) Applicant: WEISS UMWELTTECHNIK GMBH, Reiskirchen (DE)

(72) Inventors: Christian Haack, Marburg (DE); Volker Schlosser, Gruenberg (DE)

(73) Assignee: WEISS UMWELTTECHNIK GMBH, Reiskirchen (DE)

( * ) Notice: Subject to any disclaimer, the term of this patent is extended or adjusted under 35 U.S.C. 154(b) by 119 days.

(21) Appl. No.: 16/035,894

(22) Filed: Jul. 16, 2018

(65) Prior Publication Data
US 2019/0137127 A1  May 9, 2019

(30) Foreign Application Priority Data
Jul. 19, 2017 (DE) .......................... 10 2017 212 412

(51) Int. Cl.
| | |
|---|---|
| *F24F 6/12* | (2006.01) |
| *F24F 11/00* | (2018.01) |
| *F24F 6/02* | (2006.01) |
| *F24F 3/14* | (2006.01) |
| *G01N 17/00* | (2006.01) |

(Continued)

(52) U.S. Cl.
CPC .......... *F24F 11/0008* (2013.01); *F24F 6/025* (2013.01); *F24F 6/12* (2013.01); *F24F 2003/1446* (2013.01); *F24F 2006/006* (2013.01); *F24F 2006/008* (2013.01);

(Continued)

(58) Field of Classification Search
CPC ............ F24F 11/0008; F24F 2006/008; F24F 2110/10; F24F 2110/20; F24F 6/12; G01N 17/002
See application file for complete search history.

(56) References Cited

U.S. PATENT DOCUMENTS

| | | | |
|---|---|---|---|
| 3,987,133 A | 10/1976 | Andra | |
| 4,644,790 A * | 2/1987 | Mizoguchi | ............. G01F 23/02 |
| | | | 261/119.1 |

(Continued)

FOREIGN PATENT DOCUMENTS

| | | |
|---|---|---|
| CN | 1516797 A | 7/2004 |
| CN | 1973173 A | 5/2007 |

(Continued)

OTHER PUBLICATIONS

Machine Translation of DE 3630886 to Mayer, eSpacenet "Climatic testing chamber with a cooling unit", Dec. 10, 1987; description.*

*Primary Examiner* — Filip Zec
(74) *Attorney, Agent, or Firm* — King & Schickli, PLLC (57) ABSTRACT

The invention relates to a humidifier (10) for a test chamber, in particular a climate chamber or the like, as well as to a method for conditioning air of a test space of a test chamber, said humidifier comprising a container (11) having a container interior (12) for receiving a water bath (13), a heating device (15) of a temperature-control system (14) for controlling the temperature of the water bath, and a ventilation system (17) for generating air bubbles (18) in the water bath, a container opening (28) being formed in the container above the water bath in order to connect the container interior to a test space of a test chamber, said humidifier comprising a cooling device (16) of the temperature-control system.

23 Claims, 3 Drawing Sheets

(51) Int. Cl.
*F24F 110/20* (2018.01)
*F24F 110/10* (2018.01)
*F24F 6/00* (2006.01)

(52) U.S. Cl.
CPC ....... *F24F 2110/10* (2018.01); *F24F 2110/20* (2018.01); *G01N 17/002* (2013.01)

(56) References Cited

U.S. PATENT DOCUMENTS

| | | | | |
|---|---|---|---|---|
| 5,799,652 | A * | 9/1998 | Kotliar | A61G 10/00 |
| | | | | 128/200.24 |
| 6,301,433 | B1 * | 10/2001 | Montagnino | A63J 5/025 |
| | | | | 261/79.2 |
| 6,676,271 | B2 * | 1/2004 | Kohn | F21V 33/0088 |
| | | | | 362/101 |
| 7,350,773 | B2 * | 4/2008 | French | F24F 6/02 |
| | | | | 261/79.2 |
| 8,116,913 | B2 * | 2/2012 | Mirpourian | F24F 5/0085 |
| | | | | 236/49.3 |
| 2004/0072537 | A1 * | 4/2004 | Riello | F24F 1/0011 |
| | | | | 454/316 |
| 2004/0262240 | A1 * | 12/2004 | Oke | C02F 1/72 |
| | | | | 210/758 |
| 2007/0023536 | A1 | 2/2007 | Baston | |
| 2015/0290557 | A1 | 10/2015 | Govindan et al. | |

FOREIGN PATENT DOCUMENTS

| | | |
|---|---|---|
| CN | 204234107 U | 4/2015 |
| CN | 104728957 A | 6/2015 |
| CN | 104764094 A | 7/2015 |
| CN | 105605687 A | 5/2016 |
| CN | 205641664 U | 10/2016 |
| CN | 106164594 A | 11/2016 |
| CN | 206281090 U | 6/2017 |
| DE | 2134619 | 1/1973 |
| DE | 3630886 | 10/1987 |
| DE | 10259170 A1 | 7/2004 |
| JP | S5268748 A | 6/1977 |
| JP | 2005118706 A | 5/2005 |
| JP | 2006200836 A | 8/2006 |
| JP | 2007240141 A | 9/2007 |
| JP | 2015183902 A | 10/2015 |

* cited by examiner

HUMIDIFIER AND METHOD FOR CONDITIONING AIR

This application incorporates by reference the disclosure of German Patent Application no. 10 2017 212 412.1, filed Jul. 19, 2017.

TECHNICAL FIELD

The invention relates to a humidifier for a test chamber, to a test chamber as well as to a method for conditioning air of a test space of a test chamber, in particular a climate chamber or the like, said humidifier comprising a container having a container interior for receiving a water bath, a heating device of a temperature-control system for controlling the temperature of the water bath, and a ventilation system for generating air bubbles in the water bath, a container opening for connecting the container interior to a test space of a test chamber being arranged above the water bath in the container.

BACKGROUND

Such test chambers are commonly used for testing physical and/or chemical properties of objects, in particular devices. Therefore, temperature test chambers or climate test chambers are known within which temperatures ranging from −50° C. to +180° C. can be set. In climate test chambers, desired climate conditions can be additionally set to which the device or rather the test materials will be exposed for a defined period of time. Such test chambers are regularly or partially realized as a mobile apparatus which is connected to a building merely using required supply lines and comprise all necessary structural components for controlling the temperature and for conditioning. A temperature of a test space, which receives the test materials to be tested, is regularly controlled in an air circulation duct within the test space. One or more heat exchangers for heating or cooling the air flowing through the air circulation duct or the test space, respectively, are arranged in the air circulation duct. For this purpose, a fan or a ventilator suctions the air in the test space and directs it in the air circulation duct to the corresponding heat exchangers. The test materials can thus be controlled in temperature or even be exposed to a defined change in temperature. During a test interval, a temperature can alternate between a temperature maximum and a temperature minimum of the test chamber, for example.

Furthermore, it is regularly intended to set a relative air humidity within the test space during a test interval or to condition the air in the test space regarding its relative humidity. Besides dehumidifying the test space via a condenser, for example, a humidifier, which is installed in the climate test chamber, is used. In this instance, in particular humidifiers are known which are formed within the test space in a tub-like indentation in a bottom of the test space. The tub-like indentation has a heating element by means of which water, which has been filled in the indentation, can be heated or condensed. Furthermore, a discharge can be provided in the tub-like indentation and can discharge the water when required. A disadvantage in this instance is that the water within the test space can absorb contaminants from specimens, which in turn can lead to components of the humidifier, such as a heating element, being corroded. Furthermore, the water can only be discharged from the test space after completing a test cycle but not during a test cycle so as to not influence the test cycle. However, influencing a test cycle at least minimally cannot be avoided due to the water even when the humidifier function is switched off. Especially test cycles having changes in temperature below freezing require the water in the tub to be discharged. This kind of humidifier is comparatively expensive to produce since correspondingly adjusted humidifiers have to be formed in the bottom of the respective test space for different test chamber sizes.

In DE 10 259 170 A1, a humidifier is proposed which is formed by a container, which is separate from a test space and is filled with a water bath. A temperature-control system for heating the water bath is arranged within the water bath and a so-called aerator for generating air bubbles in the water bath is arranged below the temperature-control system. In order to humidify air in a test space, it is intended to control the temperature of the water bath at a temperature ranging from 50° C. to 80° C. and to direct air in the test space which rise as air bubbles in the water bath. For this purpose, the air is in particular free of aerosols so that the test space is not humidified by steam. It is particularly advantageous in this instance that a water bath does not have to be provided in the test space and that the water bath cannot be contaminated by contaminants, for example. A disadvantage in the known humidifier is that a humidification can only be controlled inertly due to the amount of water in the container. A high humidity constant or even a very quick change in air temperature or a relative air humidity in the test space can therefore not be realized in the course of a test interval using the humidifier. Especially when lowering an air temperature in the test space, a dehumidifier, for example, is required for dehumidifying the air in the test chamber.

SUMMARY

The object of the invention at hand is therefore to propose a humidifier for a test chamber and a method for conditioning air of a test space of a test chamber, both the humidifier and the method enabling a high consistant of a relative air humidity in a test space even for quickly changing test conditions.

This object is attained by a humidifier having the features of claim 1, a test chamber having the features of claim 12, and a method having the features of claim 13.

The humidifier for a test chamber, in particular a climate chamber or the like, according to the invention comprises a container having a container interior for receiving a water bath, a heating device of a temperature-control system for controlling the temperature of the water bath, and a ventilation system for generating air bubbles in the water bath, a container opening for connecting the container interior to a test space of a test chamber being formed in the container above the water bath, said humidifier comprising a cooling device of the temperature-control system.

The container of the humidifier is essentially closed and temperature-insulated, and the heating device is arranged in the water bath so as to be able to heat the water bath using the heating device. The container opening serves for being tightly connected to a test space so that humidified air from the container can be directed to a test space via an air duct or tube, for example. Thus, the humidifier can generally be modularly realized independently of a size of a test chamber or rather a test space. It is also no longer required to realize individually adjusted humidifiers within a test space, for which reason the humidifier according to the invention can be produced particularly inexpensively. Since the humidifier comprises the cooling device of the temperature-control system arranged in the water bath, it becomes possible to control the temperature of the water bath such that it has a comparatively low temperature. Thus, quick changes in the temperature of the humidifier or the water bath and thus humidified, aerosol-free air can be generated having any dew point temperature. Furthermore, the test space can be dehumidified by means of the humidifier.

As cooling the water bath has now become possible, an exact temporal constant of a relative air humidity can be attained in the test space since the temperature of the water bath can be quickly decreased and thus be controlled comparatively accurately. Furthermore, a very low temperature of the water bath can be set by means of the cooling device so that comparatively cold, aerosol-free air can be conveyed to the test space. Heating this air in the test space leads to a reduction of a relative air humidity within the test space and thus to a dehumidification of the test space. For this purpose, it can be intended in particular to discharge air via an outlet valve in the test space so that a particularly quick dehumidification can be carried out having a discharge of contaminants possibly found in the air. Besides the high temporal constant of a relative air humidity in the test space, a quick change of a dew point temperature is consequently possible in the test space. The humidifier can be used for various test chambers due to its modular design.

A ventilation device of the ventilation system can be allocated spatially to both the heating device and the cooling device. These ventilation devices can each be arranged in the water bath. The respective ventilation device can be arranged below the heating device or the cooling device, respectively, so that air bubbles generated using the ventilation devices can rise in the water bath in the area of the heating device and the cooling device, respectively. It thus becomes possible to influence the air in the container interior as directly as possible via the heating device and the cooling device, respectively. The ventilation devices can also be separate from each other so as to operate the ventilation devices separately or to individually generate air bubbles in the water bath from each other. The ventilation system can further comprise at least one pump by means of which the ventilation devices can be supplied with air. For this purpose, an amount of air can be divided in differing amounts among the ventilation devices. Thus, for example, the heating device can initially be operated for generating warm satiated air and be supplied with air bubbles via the spatially allocated ventilation device. Should cooling the specimen or the air in the test space be intended in the course of a test interval, the water bath can be subsequently cooled by operating the cooling device, wherein air bubbles of the allocated ventilation device flow around the cooling device so that comparatively cold satiated air can be generated for the test space.

The respective ventilation devices can comprise a compressed-air line having an air outlet, a porous membrane forming the air outlet in each instance and being arranged below the heating device and the cooling device in each instance. The porous membrane can, for example, be formed from a porous ceramic material in the make of a so-called aerator. The compressed-air line can be a tube or a hose which connects a pump, for conveying air or for generating compressed air, to a ventilation device. By using the porous membrane, it becomes possible to generate a large amount of air bubbles simultaneously and to thus also form a particularly large surface of the water bath in the area of the heating device and/or the cooling device. Air satiated with water or air having a specific dew point temperature can thus be quickly generated in a large amount and be directed to a test space.

Advantageously, the porous membrane can be disc-shaped. The porous membrane can be arranged below the heating device and the cooling device relative to a water level of the water bath in such a manner that the heating device and/or the cooling device can be at least entirely surrounded by the air bubbles. With this disc-shaped porous membrane air bubbles can be generated on a large surface of the porous membrane simultaneously having a low structural height.

The heating device and the cooling device can each be realized having a heat exchanger arranged in the water bath. The heat exchanger of the heating device can be an electric heating rod, for example, or a tube through which a heat-carrying medium flows. The cooling device can also be a tube which is arranged within the water bath and through which a heat-carrying medium or a refrigerant, respectively, flows. The tube can be realized so as to be meandering or helical in shape so that heat can transition from the heating device and/or the cooling device, respectively, to the water bath as well as possible.

The humidifier can comprise a flow system which comprises a duct arranged in the container, the upper end of the duct and the lower end of the duct being open, the heat exchanger then being able to be arranged in the duct. Consequently, the flow system can be positioned in the water bath as a kind of vertical shaft so that the heat exchanger of the heating device and/or the cooling device can be arranged within the flow system or the duct, respectively. In particular when generating air bubbles below the respective heat exchanger by means of the ventilation system, the air bubbles can then flow through the duct and thus surround the respective heat exchanger. It can also be ensured by means of the flow system that the water of the water bath within the flow system or duct is essentially heated or cooled by the respective heat exchanger. The air bubbles flowing through the duct are thus specifically guided through the heated or cooled water, which enables particularly quickly generating satiated air having the desired dew point temperature. In particular, it is then no longer required to set the water bath at the desired temperature in order to generate the satiated air, but rather it suffices to control the temperature of only the water within the duct. The water outside of the duct then merely serves as a steaming reservoir and can flow into the duct when required. The duct can be realized large enough that an interior volume of the duct is 1:5, 1:10 or larger in relation to a total volume of the water bath. As the air bubbles can rise in the duct, the heat exchanger of the cooling device can easily be kept from becoming frozen. If a heat exchanger which can be cooled particularly well is used, the water at the surface of the heat exchanger can freeze which leads to the humidifier having to be put out of service and be thawed. If the rising air bubbles generate a turbulent current in the area of a surface of the heat exchanger, ice can be easily kept from forming at the surface. Thus the duct can be formed by a hollow profile in the make of a tube, an upper edge of the upper end being arranged above a water level of the water bath. Consequently, the water level can be raised far enough that the upper edge is always above the water level or protrudes from the water bath. Depending on the amount of air injected using the ventilation system, the air bubbles cause the water level in the hollow profile to rise within the hollow profile relative to the water level in the remaining container interior or to a residual amount of water of the water bath. The air bubbles cause the water level of a partial amount of water of the water bath in the duct to "froth". In particular then the water level can be raised so much that the water of the water bath or rather the partial amount of water overflows from the hollow profile via the upper edge and mixes with the residual amount of water of the water bath outside of the hollow profile. Depending on the dosage of an amount of air, the water bath can also be quickly mixed with warm and/or cold water generated by the heat exchanger in order to increase or decrease an average temperature of the water bath or of a total amount of water.

It is advantageous if the heat exchanger of the heating device and the heat exchanger of the cooling device are each arranged within the hollow profile. Consequently, a hollow profile can be allocated to the heating device and the cooling device, respectively. It then also becomes possible, for example, for air bubbles to be simultaneously supplied to and flow around the respective heat exchanger of the heating device and of the cooling device. Thus, a cooling phase can already be commenced while a heating phase phases out, whereby a quicker change of a humidifying function can be realized. The duct can be realized in such a manner that and ventilation devices of the ventilation system can each be arranged below or within the duct that air bubbles mostly, preferably exclusively, rise within the duct in the water bath.

Furthermore, the humidifier can comprise a filling level sensor, a supply valve and a discharge valve. Water can be dosed into the container interior via the supply valve and can be discharged from the container interior via the discharge valve as required. The filling level sensor can be used for constantly controlling a height of a water level in the container interior in conjunction with a control device. In particular when water satiated with air from the container interior is discharged, a loss of water can be compensated by subsequent dosing using the supply valve. In order to prevent a possibly required cleaning of the container interior or of the humidifier due to residue in the water, demineralized water can be used for the water bath.

A particularly high temporal constant of a relative humidity can be attained using the humidifier if the humidifier comprises a control device having a test-chamber control circuit and a humidifier control circuit, said test-chamber control circuit comprising a humidity sensor for measuring a relative air humidity in the test space and being able to serve for controlling humidity in the test space, said humidity control circuit comprising a temperature sensor for measuring the temperature in the water bath and/or a humidity sensor, preferably a dew point sensor, for measuring a relative air humidity in the container interior and serving for controlling the humidity and/or temperature in the container interior, said control device being able to be realized as a cascading control having the test-chamber control circuit as a guiding controller and the humidity control circuit as a follow-up controller. Besides an improved absolute accuracy of the humidifier regarding the humidified air in the test space, the thus realized cascading control also enables a quicker reaction or rather a temporally quicker response behavior of the humidifier and therefore a dynamic control of test intervals. Thus, decreasing and increasing a relative air humidity in a test space can be commenced by generating an initially strongly chilled low or strongly heated high, respectively, water temperature in the humidifier. The respective water temperature and the conveyed amount of air can be adjusted smoothly using the humidifier control circuit.

The test chamber for conditioning air according to the invention comprises a temperature-insulated test space, which is sealable against an environment and receives test materials, as well as a humidifier according to the invention. Further advantageous embodiments of a test chamber can be derived from the dependent claims referring back to device claim 1.

In the method for conditioning air of a test space of a test chamber, in particular a climate chamber or the like, using a humidifier according to the invention, a water bath is received in a container interior of a container of the humidifier and is controlled in temperature by means of a heating device of a temperature-control system of the humidifier, air bubbles being generated in the water bath by means of a ventilation system of the humidifier, a container opening formed in the container connecting the container interior to a test space of a test chamber above the water bath, said water bath being controlled in temperature by means of a cooling device of the temperature-control system of the humidifier.

The description of advantages of the humidifier according to the invention is referred to for the advantageous effects of the method according to the invention. According to this, the temperature of the water bath is additionally controlled in temperature by means of the cooling device, which enables quickly cooling the water bath and thus generating satiated air having a comparatively low dew point temperature.

The water bath can be controlled in temperature by means of the heating device and the cooling device at a temperature ranging from 10° C. to 100° C., preferably from 2° C. to 100° C. Especially a low water temperature can be used for adjusting or rather specifically controlling the test space or rather its air humidity within a test interval even at low air temperatures. Furthermore, cold air can be used for dehumidifying the test space. Vice versa, it is also possible to heat the water bath enough that the water boils and the humidifier then is used as type of steam generator. As air bubbles are generated in the water bath via the ventilation system of the humidifier, air is constantly supplied to the container interior via a pump of the ventilation system, for example. This air can then be supplied into the test space via an air duct or a tube, for example, the air being able to be transported between the container interior and the test space via a difference in partial pressure. Optionally, it is also possible, of course, to specifically form an air flow from the container interior into the test space using a ventilator, for example.

A heat exchanger of the heating device and a heat exchanger of the cooling device can each be arranged in the water bath in a duct of a flow system of the humidifier, a partial amount of water of a total amount of water of the water bath being able to controlled in temperature within the respective duct by means of the corresponding heat exchanger. The partial amount of water can be a fifth, a tenth or less of the total amount of water or of a residual amount of water of the water bath. It is therefore already sufficient, to control a fraction of the total amount of water in temperature in order to generate satiated aerosol-free air by means of the air bubbles in the water bath. By controlling the temperature of the respective partial amount of water, a response time or rather a dynamic of the humidifier can be substantially improved when conditioning air.

Consequently, the partial amount of water can be controlled at a temperature deviating significantly from a temperature of a residual amount of water of the total amount of water. Should this be required, a temperature of the partial amount of water can be quickly compensated with the residual amount of water by the ventilation system initiating a mixing of the partial amount of water with the residual amount of water.

It can be intended to generate an amount of air bubbles by means of the ventilation system, which rise in the water bath within a hollow profile of the duct, an upper edge of the hollow profile being arranged above a water level of the water bath. The air bubbles then essentially rise of their own accord in the partial amount of water, which is controlled in temperature so that essentially only the partial amount of water controlled in temperature can be used for generating the satiated air.

Figure 1A:
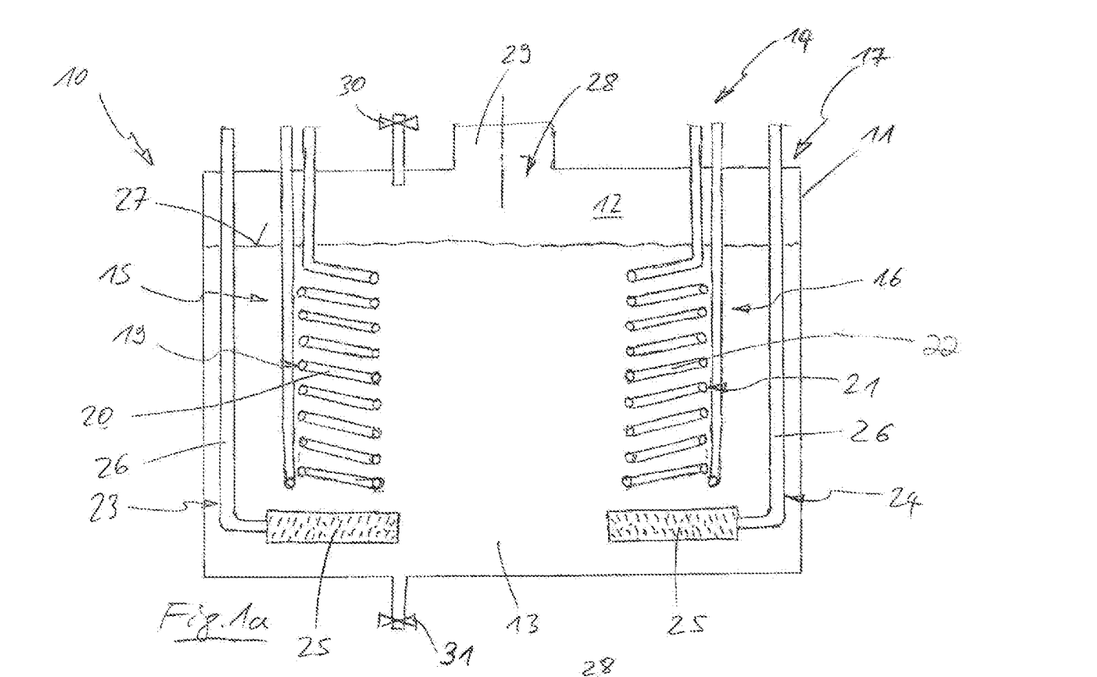

The air bubbles can rise in the partial amount of water and increase the water level within the hollow profile relative to the water level outside of the hollow profile. As long as an increase in the water level within the hollow profile does not rise above the upper edge of the hollow profile, a mixing of the partial amount of water with the residual amount of water can be mostly precluded. Depending on the temperature set for the water bath, a dew point temperature of the air or rather the amount of air escaping via the air bubbles can be set very accurately. It thus becomes possible to ensure a very high temporal constant of the relative air humidity in the test space by supplying a flow of satiated air in the test space.

The air bubbles can also rise in the partial amount of water and convey the partial amount of water from the hollow profile via the upper edge of the hollow profile in such a manner that the partial amount of water is mixed with a residual amount of water of the total amount of water. By being mixed with the residual amount of water, the temperature of the residual amount of water can be lowered or raised, respectively, very quickly. In particular if the partial amount of water is substantially smaller in comparison to the residual amount of water, a temperature of the partial amount of water can be essentially adjusted to a temperature of the residual amount of water in only seconds. Depending on the intensity of the mixing, which depends on the partial amount of water overflowing via the upper edge of the hollow profile, the mixing can be carried out slowly or quickly.

It can be intended that aerosol-free air, preferably satiated aerosol-free air, is generated at a temperature ranging from 10° C. to 100° C., preferably 2° C. to 100° C., by means of the temperature-control system and the ventilation system and is conveyed to the test space via the container opening. Preferably, there is a pressure in the container interior which prevents steam from being generated. Furthermore, an amount of air is adjusted as a function of a dew point temperature required in the test space. At a high dew point temperature to be attained, an amount of air conveyed using the ventilation system can be reduced to 0.1 $m^3/h$ to 0.2 $m^3/h$, for example, in order to attain a sufficiently constant control of the dew point temperature.

Alternatively, the test space can also be dehumidified via an open positive pressure valve in the test space, aerosol-free air being generated at a temperature ranging from 2° C. to 30° C., preferably 2° C. to 10° C., by means of the temperature-control system and the ventilation system and being conveyed to the test space via the container opening. In particular if an air temperature is higher within the test space than an air temperature of the aerosol-free air, the latter can still absorb water and be conveyed from the test space via the positive pressure valve. A condensation of the water in the test space for dehumidification or a specific aeration is then no longer required. Via this method of dehumidification, a specific dew point temperature can be set very accurately in the test space.

In another embodiment of the method, aerosol-containing air, in particular steam, can be generated by means of the heat exchanger of the heating device by boiling the partial amount of water by means of the temperature-control system and the ventilation system and can be conveyed to the test space via the container opening. Discharging steam from the partial amount of water can be further promoted by generating air bubbles in the partial amount of water. However, it is generally possible to use the humidifier as an unpressurized steam humidifier and to forego generating air bubbles. By supplying steam in the test space, a very high humidifier performance can be attained. This method variation can be advantageously used for dew point temperatures of ≥+12° C. It is also particularly advantageous to use various method variations in a sequence, for example by forming steam for attaining a high relative air humidity in the test space and by subsequently conveying aerosol-free air in the test space for maintaining and controlling the desired level of relative air humidity. When operated as an unpressurized steam humidifier, possible losses in water in the test space can be compensated solely via difference in partial pressure. Since the ventilation system does not have to be in operation in this instance, the humidifier can be operated in particular so as to conserve water and be energy-efficient.

An air flow from the container interior to the test space can be realized by means of a difference in partial pressure generated by the ventilation system between the container interior and the test space. A conveyor amount of the ventilation system or rather a pump of the ventilation system then determines the air flow or an amount of air supplied to the test space. A control of this conveyor amount can serve for setting the relative air humidity in the test space besides a dew point temperature of the air.

An air flow can be supplied to the test space at a ventilator in the test space from the container interior in the test space. It would then become possible, for example, to supply steam into the test space, without the steam condensing on cold surfaces, for example, in the test space. The ventilator causes an intensive mixing of air in the test space with the steam or the air flow from the container interior so that a condensation of steam is prevented and a relative air humidity or a dew point temperature, respectively, can be quickly increased in the test space.

Advantageously, a humidity constant in the test space, which is based on a temporal period, can be controlled having a tolerance of <±1% relative air humidity by means of a control device of the humidifier.

BRIEF DESCRIPTION OF THE DRAWING FIGURES

Further advantageous embodiments of the method can be derived from the description of features of the dependent claims referring back to device claim 1.

In the following, preferred embodiments of the invention are further described in reference to the attached drawings.

In the following,

FIGS. 1*a* to 1*b* illustrate a schematic sectional view of a first embodiment of a humidifier in different operational modes;

FIGS. 2*a* to 2*d* illustrate a schematic sectional view of a second embodiment of a humidifier in different operational modes.

DETAILED DESCRIPTION

A synopsis of FIGS. 1*a* to 1*b* illustrates a humidifier 10 for a test chamber (not illustrated in this instance) or rather a test space, said humidifier 10 being made of a container 11 having a container interior 12, in which a water bath 13 is received, and a temperature-control system 14, having a heating device 15 and a cooling device 16 for controlling the temperature of the water bath 13. Furthermore, the humidifier 10 comprises a ventilation system 17 for generating air bubbles 18 in the water bath 13.

The heating device 15 comprises a heating coil 19 of a resistance heating element 20, said heating coil 19 being positioned in the water bath 13. The cooling device 16 comprises a cooling coil 21 made of a tube 22 having a refrigerant circulating therein. The cooling coil 21 is also arranged within the water bath 13. The ventilation system 17 comprises two ventilation devices 23 and 24, which are allocated spatially to the heating device 15 or the cooling device 16, respectively. Each of the ventilation devices 23 and 24 is formed from a porous membrane 25, which are disc-shaped, and a compressed-air line 26. The compressed-air lines 26 are each connected to a pump (not illustrated in this instance) of the ventilation system 17 and can be supplied with compressed air individually of each other. The respective porous membranes 25 are arranged directly below the heating coil 19 or the cooling coil 21, respectively, relative to a water level 27 of the water bath 13.

In the container 11, a container opening 28 is formed above the water level 27 and transitions into an air duct 29, which connects the container 11 to the test space (not illustrated in this instance). Valves or similar devices are not provided in the air duct 29 so that the air duct 29 essentially connects the container interior 12 to the test space without pressure. Furthermore, the humidifier 10 comprises a filling level sensor (not illustrated in this instance) as well as a supply valve 30 and a discharge valve 31. Water, in particular demineralized water, can be dosed in the container interior 12 via the supply valve 30, water of the water bath 13 being able to be discharged from the container interior 12 using the discharge valve 31. A height of the water level 27 can be kept essentially constant by adding water even at a loss of water due to steaming. Furthermore, it is possible to completely drain the water bath 13, for example for maintenance services.

Figure 1B:
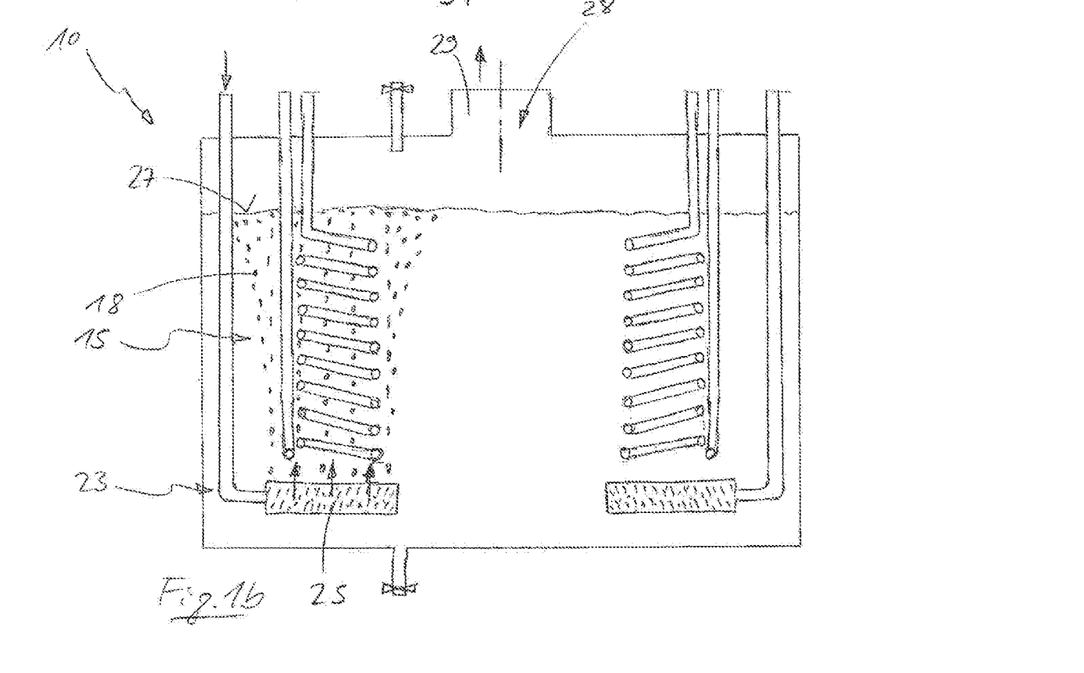

As can be seen in FIG. 1b, a pressurization of the porous membrane 25 of the ventilation devices 24 with compressed air causes air bubbles 18 to rise in the water bath 13 from the porous membrane 25 to the water level 27, the heating coil 19 being encased or surrounded by air bubbles 18 in this instance. The air supplied via the compressed-air line 26 in the container interior 12 flows out of the container interior 12 via the container opening 28 and gets into the test space. Since this air gets through the water bath 13 in the form of air bubbles 18, the air is controlled in temperature according to a temperature of the water bath 13 and is satiated with water so that the air flowing to the test chamber is aerosol-free. By controlling the temperature-control system 14 and the ventilation system 17 using a control device (not illustrated in this instance) of the humidifier 10, it is possible to set the temperature of the water bath 13 such that a dew point temperature of the satiated air can be set very accurately. A performance of the humidifier 10 can be controlled very accurately in conjunction with the set dew point temperature, if required, by controlling a conveyor amount of air via the pump of the ventilation system 17. For lowering a dew point temperature of the air, the heating device 15 can be switched off using the ventilation device 23, for example, and the cooling device 16 can be switched of n using the ventilation device 24 so that a temperature of the water bath 13 and thus a dew point temperature of the air decreases.

It is generally also possible to use the humidifier 10 as a kind of unpressurized steam humidifier. The water bath 13 can then be heated to a boiling point of the water by means of the heating coil 19, the thus generated steam then being able to be conveyed to the test space via the air duct 29. Owing to this, a very high performance of the humidifier 10 can be realized. This performance can be increased even further if the pump of the ventilation system 17 is activated during the boiling procedure and air is injected into the water bath 13 via the ventilation devices 23 or 24, respectively. A degree of turbulence of the water bath 13 increased thus leads to an improved discharging of the generated steam from the container interior 12.

The humidifier 10 comprises, in conjunction with the control device not illustrated in this instance, a test-chamber control circuit (also not illustrated in this instance) and a humidifier control circuit having sensors for measuring the temperature and/or relative air humidity. In order to control the humidity and/or the temperature in the test space, the test-chamber control circuit is coupled to the humidifier control circuit in the scope of a cascading control, said test-chamber control circuit being realized as a guiding controller and said humidifier control circuit being realized as a follow-up controller. The water bath 13 can then initially overheat, for example, if a large amount of satiated warm air is to be supplied to the test space quickly. The test space can also be dehumidified via the control device by supplying very cold satiated air to the test space. The air, which then heats up in the test space, can be enriched with water and be discharged into an environment via a positive pressure valve of the test space, if required also in conjunction with contaminants of a specimen in the test space.

A synopsis of FIGS. 2a to 2d illustrates another embodiment of a humidifier 32 which in contrast to the humidifier from FIG. 1 comprises a flow system 33 arranged at the heating coil 19 and the cooling coil 21 in each instance. The flow system 33 forms a duct having an upper end 35 and a lower end 36, which are each open. The heating coil 19 and the cooling coil 21 are each arranged in the duct 34. The duct 34 is formed by a tube 37 which is expanded at the lower end 36. The upper end 35 protrudes a bit over the water level 27, i.e. a few centimeters.

Figure 2A:
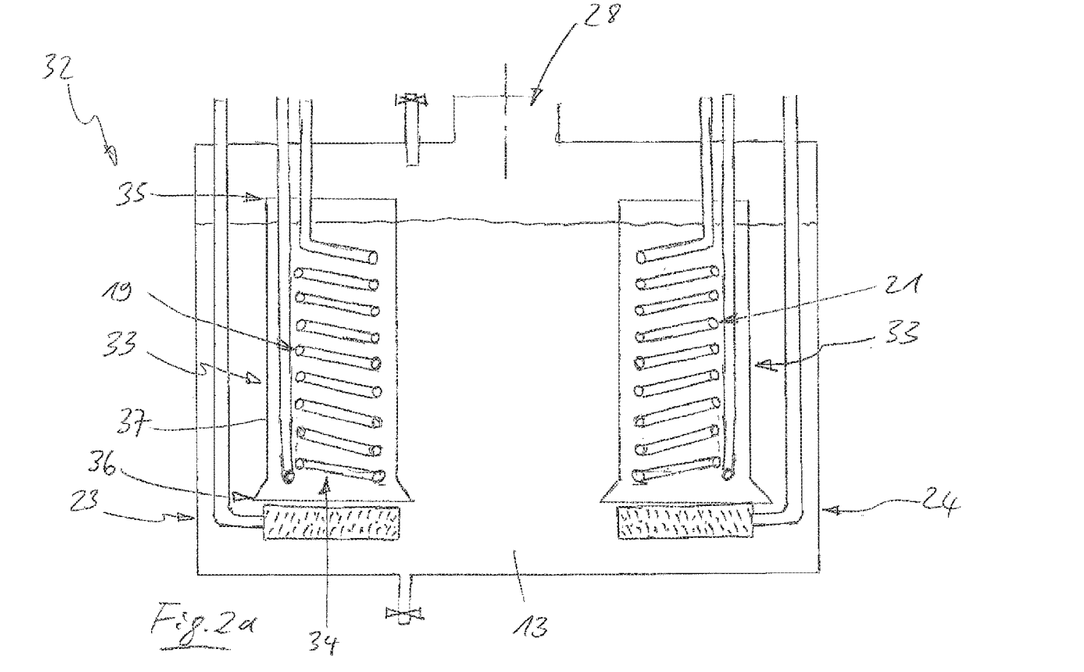
Figure 2B:
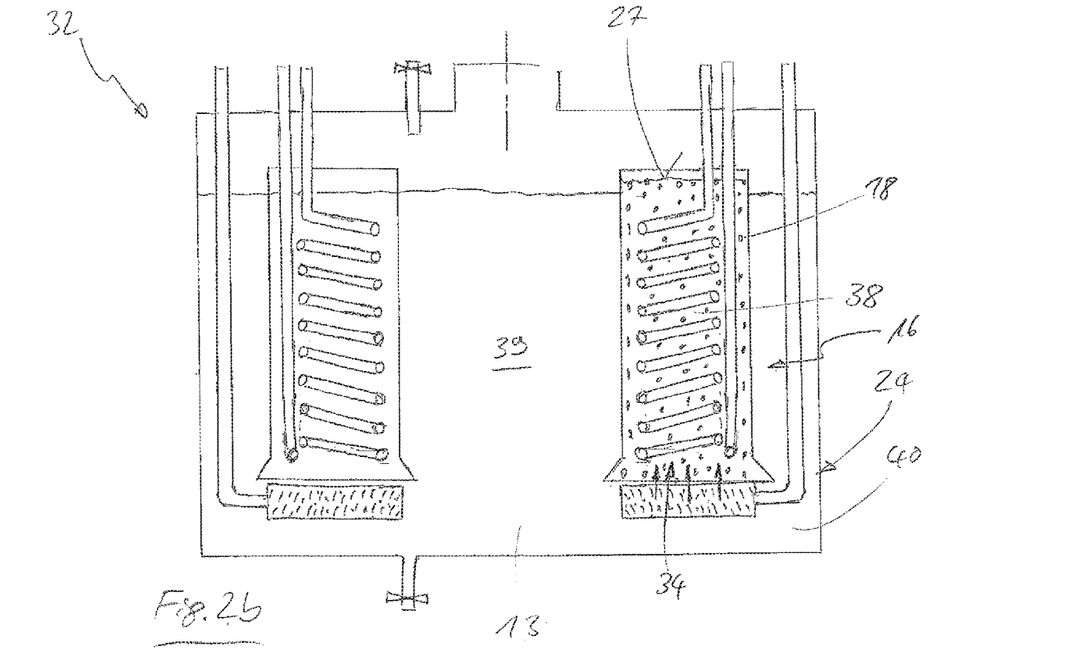

As can be seen in FIG. 2b, the water bath 13 is also aerated using air bubbles 18 via the ventilation device 24, as shown in the example of the cooling device 16. The air bubbles 18 get into the duct 34 via the tube 37, which is expanded at the lower end 26, however, so that the cooling coil 21 is closely surrounded by air bubbles 18 flowing through the duct 34 to the top. Consequently, air bubbles specifically flow through a partial amount of water 38 of a total amount of water 39 of the water bath 13. This also causes the water level 27 to rise in the tube 37 as compared to a residual amount of water 40 of the water bath 13, through which air bubbles 17 do not flow. The partial amount of water 38 is controlled in temperature by means of the cooling coil 21 in a desired manner so that the total amount of water 39 does not have to be controlled in temperature in this instance in order to generate satiated air having the desired dew point temperature. Since the partial amount of water 38 is much smaller than the residual amount of water 40 or the total amount of water 39, the partial amount of water 38 can also be controlled in temperature much faster than the total amount of water 39 so that the humidifier 32 can be operated by means of the flow system 33 so as to be energy-efficient and has changes in temperature as dynamically as possible while generating the same amount of air as compared to the humidifier from FIG. 1.

Figure 2C:
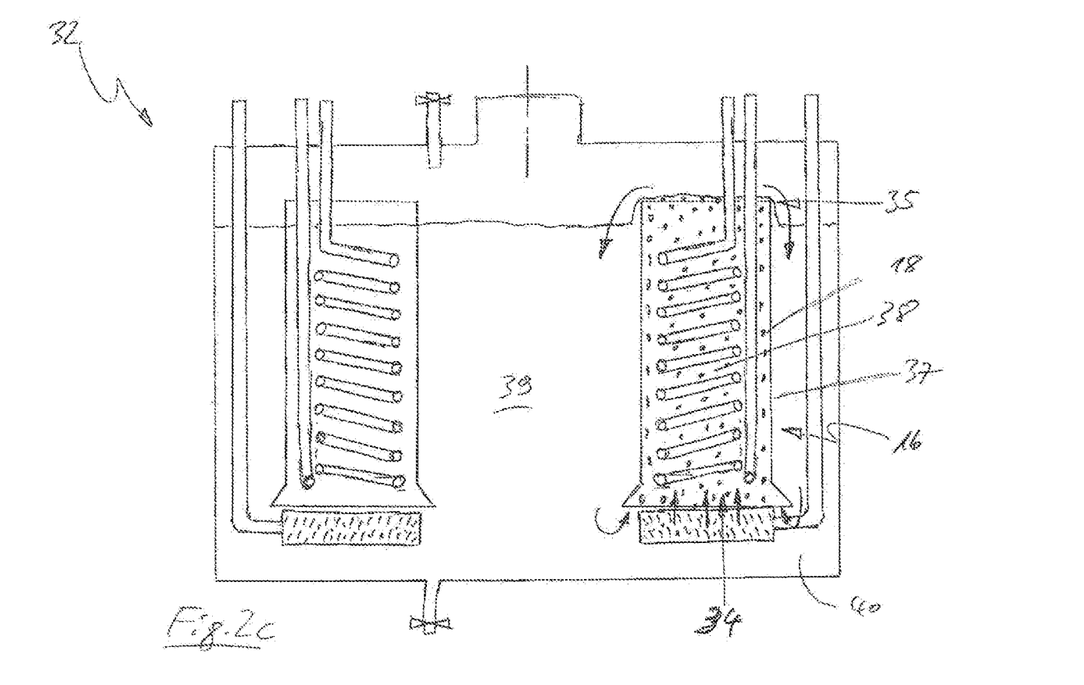

As can be derived from FIG. 2c, an amount of air from the ventilation device 24 can be increased so far that the air bubbles 18 convey the water of the partial amount of water 38 over the upper end 35 of the tube 37 and thus form a current in the tube 37 which causes the partial amount of water 38 to be mixed with the residual amount of water 40. If, for example, a temperature of the partial amount of water 38 is comparatively low and a temperature of the residual amount of water 40 is comparatively high, both temperatures can be quickly conditioned and thus the temperature of the partial amount of water 38 can be quickly changed. Thus it becomes possible to generate air having dew point temperatures which significantly deviate from each other within only seconds using the humidifier 32 in the course of a test interval.

Figure 2D:
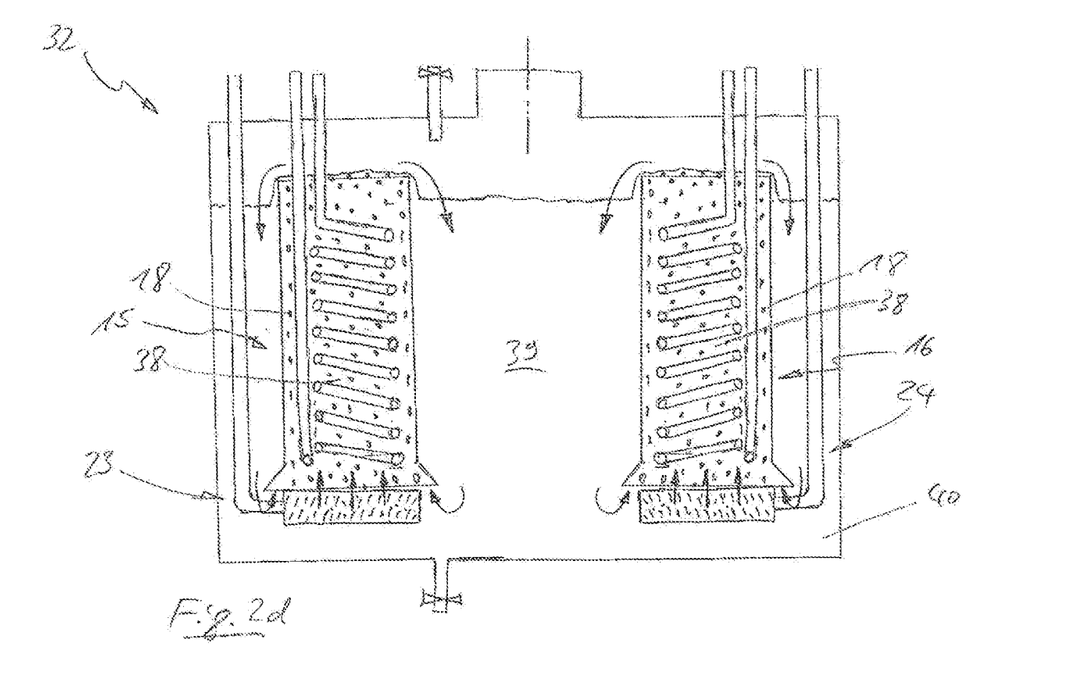

FIG. 2d illustrates the humidifier 32 during an operation of the ventilation devices 23 and 24 so that the residual amount of water 40 is mixed completely with the respective partial amounts of water 38.

The invention claimed is:

1. A humidifier (10, 32) for a test chamber, in particular a climate chamber, said humidifier comprising a container (11) having a container interior (12) for receiving a water bath (13), a heating device (15) of a temperature-control system (14) for controlling the temperature of the water bath, and a ventilation system (17) for generating air bubbles (18) in the water bath, a container opening (28) being formed in the container above the water bath in order to connect the container interior to a test space of a test chamber, wherein the humidifier comprises a cooling device (16) of the temperature-control system;
wherein a first ventilation device (23) of the ventilation system (17) is adjacent to the heating device (15) and a second ventilation device (24) is adjacent to the cooling device (16); and
wherein the heating device (15) and the cooling device (16) each have a heat exchanger (19, 21) arranged in the water bath (13).

2. The humidifier according to claim 1, characterized in that the first and second ventilation devices (23, 24) each comprise a compressed-air line (26) having an air outlet, a porous membrane (25) forming the air outlet in each instance and being arranged below the heating device (15) and the cooling device (16), respectively.

3. The humidifier according to claim 2, characterized in that the porous membrane (25) is disc-shaped.

4. The humidifier according to claim 1, characterized in that the humidifier (32) comprises a flow system (33) comprising a duct (34) arranged in the container (11), an upper end (35) of the duct (34) and a lower end (36) of the duct (34) being open, the heat exchanger (19, 21) being arranged in the duct.

5. The humidifier according to claim 4, characterized in that the duct (34) is formed by a hollow profile (37), an upper edge of the upper end being arranged above a water level (27) of the water bath (13).

6. The humidifier according to claim 5, characterized in that the heat exchanger (19) of the heat device (15) and the heat exchanger (21) of the cooling device (16) are each arranged within the hollow profile (37).

7. The humidifier according to claim 4, characterized in that ventilation devices (23, 24) of the ventilation system (17) are each arranged within or below the duct and the duct (34) is realized such that air bubbles (18) in the water bath (13) rise within the duct.

8. The humidifier according to claim 1, characterized in that the humidifier (10, 32) comprises a filling level sensor, a supply valve and a discharge valve.

9. The humidifier according to claim 1, characterized in that the humidifier (10, 32) comprises a control valve having a test-chamber control circuit and a humidifier control circuit, said test-chamber control circuit comprising a humidity sensor for measuring a relative air humidity in the test space and serving for controlling the humidity in the test space, said humidifier control circuit comprising a temperature sensor for measuring the temperature in the water bath (13) and/or a humidity sensor, preferably a dew point sensor, for measuring a relative air humidity in the container interior (12) and serving for controlling the humidity and/or temperature in the container interior, said control valve being realized as a cascading control having the test-chamber control circuit as a guiding controller and the humidifier control circuit as a follow-up controller.

10. A test chamber for conditioning air, comprising a temperature-insulated test space for receiving test materials which can be sealed against an environment as well as a humidifier (10, 32) according to claim 1.

11. A method for conditioning air of a test space of a test chamber, in particular a climate chamber or the like, using a humidifier (10, 32), a water bath (13) being received in a container interior (12) of a container (11) of the humidifier, the temperature of the water bath being controlled by means of a heating device (15) of a temperature-control system (14) of the humidifier, air bubbles (18) being generated in the water bath by means of a ventilation system (17) of the humidifier, a container opening (38), which is formed in the container, connecting the container interior to a test space of a test chamber above the water bath, characterized in that the temperature of the water bath is controlled by means of a cooling device (16) of the temperature-control system of the humidifier;
wherein a first ventilation device (23) of the ventilation system (17) is adjacent to the heating device (15) and a second ventilation device (24) is adjacent to the cooling device (16); and
wherein the heating device (15) and the cooling device (16) each have a heat exchanger (19, 21) arranged in the water bath (13).

12. The method according to claim 11, characterized in that the temperature of the water bath (13) is controlled at a temperature ranging from 10° C. to 100° C. by means of the heating device (15) and the cooling device (16).

13. The method according to claim 11, characterized in that a heat exchanger (19) of the heating device (15) and a heat exchanger (21) of the cooling device (16) are each arranged in the water bath (13) in a duct (34) of a flow system (33) of the humidifier (32), a partial amount of water (38) of a total amount of water (39) of the water bath being controlled in temperature within the respective duct by means of the respective heat exchanger.

14. The method according to claim 13, characterized in that the partial amount of water (38) is controlled in temperature by means of a temperature deviating from a residual amount of water (40) of the total amount of water (39).

15. The method according to claim 13, characterized in that the air bubbles (18) rise in the water bath (13) within the hollow profile (37) of the duct (34), an upper edge of the hollow profile being arranged above a water level (27) of the water bath.

16. The method according to claim 15, characterized in that the air bubbles (18) rise in the partial amount of water (38) and increase the water level (27) within the hollow profile (37) with respect to the water level outside of the hollow profile.

17. The method according to claim 15, characterized in that the air bubbles (18) rise in the partial amount of water (38) and convey the partial amount of water out of the hollow profile over the upper edge of the hollow profile (37) in such a manner that the partial amount of water is mixed with a residual amount of water (40) of the total amount of water (39).

18. The method according to claim 11, characterized in that the aerosol-free air is generated at a temperature ranging from 10° C. to 100° C. by means of the temperature-control system (14) and the ventilation system (17) and is conveyed through the container opening (28) to the test space.

19. The method according to claim 11, characterized in that the test space is dehumidified via an open positive-pressure valve in the test space, aerosol-free air being generated at a temperature ranging from 2° C. to 30° C. by means of the temperature-control system (14) and the ventilation system (17) and being conveyed through the container opening (28) to the test space.

20. The method according to claim 11, characterized in that aerosol-containing air is generated by means of the heat exchanger (19) of the heating device (15) by boiling the partial amount of water (38) by means of the temperature-control system (14) and the ventilation system (17) and is conveyed through the container opening (28) to the test space.

21. The method according to claim 11, characterized in that an air flow from the container interior (12) to the test space is realized between the container interior and the test space by means of a difference in partial pressure generated by the ventilation system (17).

22. The method according to claim 11, characterized in that an air flow from the container interior (12) to the test space is introduced into the test space at a ventilator arranged in the test space.

23. The method according to claim 11, characterized in that a humidity constant is controlled in the test space at a tolerance of <±1% relative air humidity by means of a control device of the humidifier (10, 32).

* * * * *